(12) United States Patent
Zhang et al.

(10) Patent No.: US 10,139,941 B2
(45) Date of Patent: Nov. 27, 2018

(54) TOUCH PANEL, MANUFACTURING METHOD THEREOF, AND TOUCH DEVICE

(71) Applicants: BOE Technology Group Co., Ltd., Beijing (CN); Hefei Xinsheng Optoelectronics Technology Co., Ltd., Hefei (CN)

(72) Inventors: Ming Zhang, Beijing (CN); Ming Hu, Beijing (CN); Yubo Xu, Beijing (CN); Weigang Gong, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 2 days.

(21) Appl. No.: 15/327,898

(22) PCT Filed: Jun. 3, 2015

(86) PCT No.: PCT/CN2015/080623
§ 371 (c)(1),
(2) Date: Jan. 20, 2017

(87) PCT Pub. No.: WO2016/101543
PCT Pub. Date: Jun. 30, 2016

(65) Prior Publication Data
US 2017/0212622 A1    Jul. 27, 2017

(30) Foreign Application Priority Data
Dec. 25, 2014    (CN) .......................... 2014 1 0826523

(51) Int. Cl.
*G06F 3/041*    (2006.01)
*G06F 3/044*    (2006.01)

(52) U.S. Cl.
CPC ............ *G06F 3/0412* (2013.01); *G06F 3/044* (2013.01); *G06F 3/0416* (2013.01);
(Continued)

(58) Field of Classification Search
CPC ................. G06F 3/0412; G06F 3/0416; G06F 2203/04103; G06F 2203/04112
(Continued)

(56) References Cited

U.S. PATENT DOCUMENTS

2011/0242046 A1    10/2011    Feng et al.
2012/0299865 A1 *  11/2012    Yu .......................... G06F 3/044
                                                        345/174

(Continued)

FOREIGN PATENT DOCUMENTS

CN    102053751 A    5/2011
CN    102723126 A    10/2012
(Continued)

OTHER PUBLICATIONS

Sep. 16, 2015—(WO) International Search Report and Written Opinion Appn PCT/CN2015/080623 with English Tran.
(Continued)

*Primary Examiner* — Mark Regn
(74) *Attorney, Agent, or Firm* — Banner & Witcoff, Ltd.

(57) ABSTRACT

A touch panel, manufacturing method thereof, and a touch device, the touch panel including a substrate; a metal mesh layer located on the substrate; and at least one layer of a functional layer having an anti-moire pattern. The functional layer reduces the occurrence of moire fringes in a display picture and improves display effect of a touch device.

17 Claims, 2 Drawing Sheets

(52) U.S. Cl.
CPC .. *G06F 3/0418* (2013.01); *G06F 2203/04103* (2013.01); *G06F 2203/04111* (2013.01); *G06F 2203/04112* (2013.01)

(58) Field of Classification Search
USPC .......................................................... 345/173
See application file for complete search history.

(56) References Cited

U.S. PATENT DOCUMENTS

| | | | | |
|---|---|---|---|---|
| 2013/0063371 | A1* | 3/2013 | Lee | G06F 3/044 345/173 |
| 2014/0204284 | A1* | 7/2014 | Yao | G06F 3/044 349/12 |

FOREIGN PATENT DOCUMENTS

| | | |
|---|---|---|
| CN | 103426502 A | 12/2013 |
| CN | 203535982 U | 4/2014 |
| CN | 103927034 A | 7/2014 |
| CN | 103955320 A | 7/2014 |
| CN | 104461156 A | 3/2015 |
| CN | 104536634 A | 4/2015 |
| CN | 104536635 A | 4/2015 |
| JP | 4610416 B2 | 1/2011 |

OTHER PUBLICATIONS

Dec. 19, 2016—(CN) First Office Action Appn 201410826523.1 with English Tran.
Jul. 10, 2017—(CN) Second Office Action Appn 201410826523.1 with English Tran.

\* cited by examiner

TOUCH PANEL, MANUFACTURING METHOD THEREOF, AND TOUCH DEVICE

The application is a U.S. National Phase Entry of International Application No. PCT/CN2015/080623 filed on Jun. 3, 2015, designating the United States of America and claiming priority to Chinese Patent Application No. 201410826523.1, filed Dec. 25, 2014. The present application claims priority to and the benefit of the above-identified applications and the above-identified applications are incorporated by reference herein in their entirety.

TECHNICAL FIELD

Embodiments of the present disclosure relate to a touch panel and a manufacturing method thereof, and a touch device.

BACKGROUND

Currently, touch panels can be classified as add-on mode touch panels, on-cell touch panels, and in-cell touch panels according to configuration and structure. An add-on mode touch panel is a touch panel with a touch control function and a display function, and is obtained through bonding a touch control module and a display module that is manufactured separately from the touch control module. One glass solution (OGS) is a technique which forms a transparent conductive film and a sensor directly on a protective glass sheet, and therefore obtains a glass sheet with the function of protective glass and the touch control sensor. Because the functions of conductive glass and protective glass are integrated in one glass sheet, the need of an ultra-thin intelligent terminal can be satisfied, and the display effect can be improved.

Because the black matrix in the display module has a grid pattern, interference can occur between a metal mesh layer in the touch panel in different structures and the black matrix in the display module, background lines (i.e., moire fringes) can be observed in displayed images, and display effect can be adversely impacted.

SUMMARY

An embodiment of the present disclosure provides a touch panel and a manufacturing method thereof, and a touch device, to suppress moire fringes in displayed images, and improve display effect.

In one aspect, the embodiment of the present disclosure provides a touch panel, which comprises: a substrate; a metal mesh layer on the substrate, and at least one functional layer with an anti-moire pattern.

In another aspect, the embodiment of the present disclosure further provides a touch panel manufacturing method, which comprising: forming a metal mesh layer on a substrate, and forming at least one functional layer with an anti-moire pattern.

In further another aspect, the embodiment of the present disclosure further provides a touch control display device, which comprising: the above touch panel and a display module overlapped with the touch panel.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Figure 1:
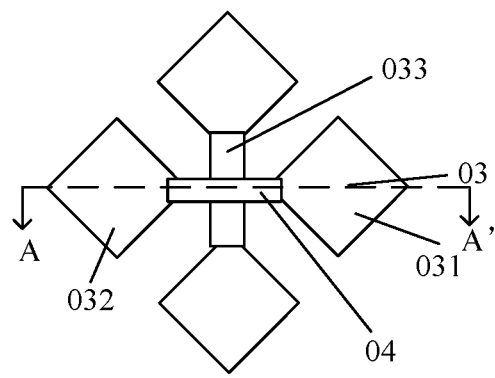
FIG. 1 is a schematically local plan view of a touch panel.
Figure 2:
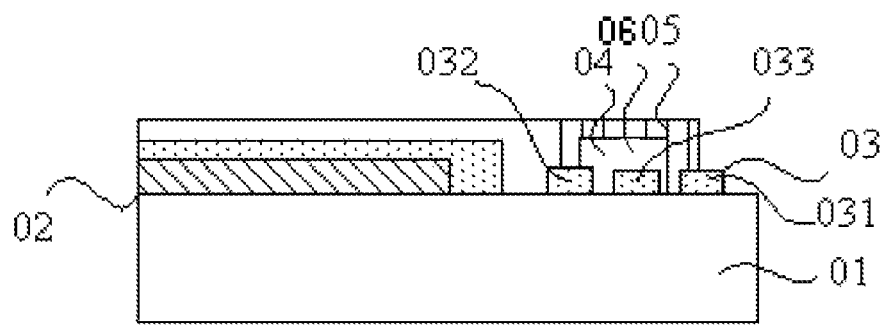
FIG. 2 is a cross-sectional view along a dash line AA' of the touch panel as illustrated in FIG. 1.

FIG. 1 is a local plan view of a touch panel; the touch panel comprises a touch control area and a periphery area around the touch control area; a plan view of a unit of the touch control area is mainly illustrated in FIG. 1; a black bezel pattern layer in the periphery area and wires on the black bezel pattern layer are not shown in FIG. 1 for simplicity, but are shown in a cross-sectional view of FIG. 2. As illustrated in FIG. 2, a touch panel with the OGS structure comprises: a substrate 01, which includes a touch control area and a periphery area around the touch control area; a black bezel pattern layer 02 in the periphery area of the substrate 01; a metal mesh layer 03 on the substrate 01 formed with the black bezel pattern layer 02, the metal mesh layer 03 further comprising the wire formed on the black bezel pattern layer 02; an insulation layer 04, for example, an organic insulation layer, located at a side of the metal mesh layer 03 far away from the substrate 01, the insulation layer also being disposed on the wire on the black bezel pattern layer 02; and a transparent conductive layer 05 located at a side of the insulation layer 04 far away from the substrate 01. The transparent conductive layer 05 is provided for connecting the metal mesh layer 03 in one direction, for example, connecting electrodes in a Y direction, for example, connecting electrodes 31 and electrode 32, the electrodes of the metal mesh layer 03 disposed in another direction are connected by a conductive pattern disposed in the same layer.

An embodiment of the present disclosure provides a touch panel manufacturing method, which comprises the following steps:

Step S101: forming a metal mesh layer on a substrate;

Step S102: forming at least one functional layer with an anti-moire pattern 06, the functional layer being a transparent conductive layer and/or an insulation layer.

Herein, the functional layer with anti-moire pattern is overlapped with the metal mesh layer in a viewing direction to suppress interference.

For the touch panel manufactured with the touch panel manufacturing method provided by the embodiment of the present disclosure, a transparent conductive layer and/or an insulation layer with an anti-moire pattern is formed, and the interference effect between the metal mesh layer and a black matrix layer in a display module is suppressed, thus moire fringes in displayed images is suppressed and the display effect of the touch device is accordingly improved. Furthermore, the manufacturing process provided by the embodiment of the present disclosure is simple because it is not necessary to form a new film layer compared with state of art.

For example, the at least one functional layer with an anti-moire pattern can be formed with the transparent conductive layer and/or the insulation layer that has been already formed, e.g., an organic insulation layer, undergoing processes such as exposure, developing, etching, and so on to have the anti-moire pattern. For another example, the transparent conductive layer and/or the organic insulation layer can be formed and patterned in a same process to have the anti-moire pattern, that is, the transparent conductive layer and/or the insulation layer with the anti-moire pattern can be directly formed.

For example, there are transparent conductive layers and organic insulation layers in an add-on mode touch panel, an on-cell touch panel, or an in-cell touch panel, the case that the at least one functional layer has an anti-moire pattern can involve the following situations: for the transparent conductive layers and the organic insulation layers in the touch panel, only one transparent conductive layer has the anti-moire pattern; alternatively, the transparent conductive layers all have anti-moire patterns; alternatively, only one organic insulation layer has the anti-moire pattern; alternatively the organic insulation layers all have anti-moire patterns; alternatively one organic insulation layer and one transparent conductive layer have anti-moire patterns, one organic insulation layer and the transparent conductive layers have anti-moire patterns, the organic insulation layers and one transparent conductive layer have anti-moire patterns, and the organic insulation layers and the transparent conductive layers all have anti-moire patterns.

It should be understood that in the case where the anti-moire patterns are formed on two layers or more layers, the anti-moire patterns in all the layers can be the same or can be different, as long as interference between the metal mesh layer and the black matrix in the display module is suppressed.

For example, in the Step S102, forming at least one functional layer with an anti-moire pattern comprises the following process:

forming at least one insulation layer, for example, an organic insulation layer, with an anti-moire pattern; and the at least one insulation layer, for example, an organic insulation layer, with the anti-moire pattern is located at a side of the metal mesh layer far away from the substrate.

Furthermore, the at least one insulation layer, for example, an organic insulation layer, with an anti-moire pattern is disposed in the touch control module of the touch panel.

Taking the touch panel with the OGS structure as an example, an exemplary manufacturing method of the touch panel provided by the embodiment of the present disclosure is provided; the manufacturing method comprises the following steps:

Step S201: forming a black bezel pattern layer on a substrate;

Step S202: forming a metal mesh layer on the substrate formed with the black bezel pattern layer;

Step S203: forming a first insulation layer (for example, organic insulation layer) with an anti-moire pattern at a side of the metal mesh layer far away from the black bezel pattern layer.

Furthermore, the manufacturing method further comprises the following steps:

Step 204: forming a transparent conductive layer on the first insulation layer (for example, an organic insulation layer) with the anti-moire pattern;

Step 205: form a second insulation layer (for example, an organic insulation layer) with the anti-moire pattern on the transparent conductive layer.

Figure 3:
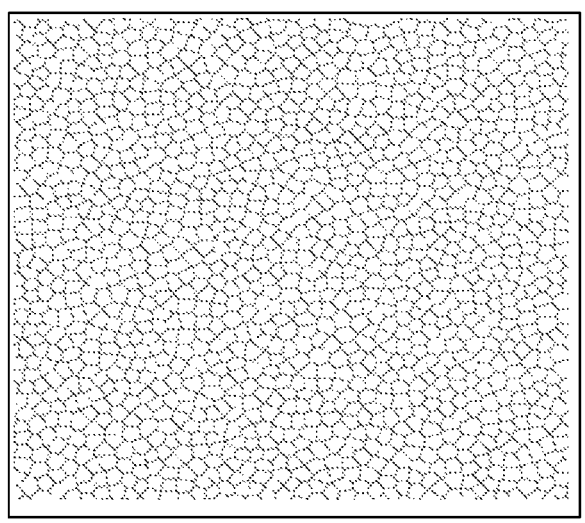
FIG. 3 is a schematic diagram of an anti-moire pattern disposed in the touch panel provided by an embodiment of the present disclosure.
Figure 4:
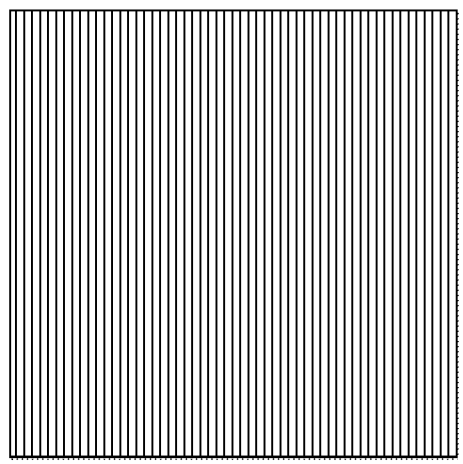
FIG. 4 is another schematic diagram of an anti-moire pattern disposed in the touch panel provided by an embodiment of the present disclosure

The shape of the anti-moire pattern can be in multiple forms, as long as the interference between the metal mesh layer and the black matrix in the display module is suppressed. As illustrated in FIG. 3 and FIG. 4, FIG. 3 is a schematic diagram of the anti-moire pattern disposed in the touch panel provided by the embodiment of the present disclosure, and FIG. 4 is another schematic diagram of the anti-moire pattern disposed in the touch panel provided by the embodiment of the present disclosure. Optionally, the anti-moire pattern can comprises a transmission grating with a plurality of stripes, or the anti-moire pattern can comprises a plurality of discontinuous scattering points. In the case that the anti-moire pattern comprises a transmission grating with a plurality of stripes, the grating can have straight line stripes, or the grating can have curve line stripes.

The embodiment of the present disclosure further provides a touch panel, which comprises a substrate, a metal mesh layer on the substrate, and at least one functional layer with an anti-moire pattern. The functional layer is a transparent conductive layer and/or an insulation layer.

For the touch panel provided by the embodiment of the present disclosure, the interference effect between the metal mesh layer and a black matrix layer in a display module can be suppressed through the at least one functional layer, for example, a transparent conductive layer and/or an insulation layer, with an anti-moire pattern therein, thus moire fringes in displayed images is suppressed and the display effect of the touch device is accordingly improved.

The touch panel provided by the embodiment of the present disclosure can be manufactured with the above touch panel manufacturing method, or manufactured with other manufacturing method.

For example, the at least one functional layer with anti-moire pattern can be formed with the transparent conductive layer and/or the organic insulation layer that has been already formed undergoing processes such as exposure, developing, etching, and so on to have the anti-moire pattern. For another example, the transparent conductive layer and/or the organic insulation layer can be formed and patterned in a same process to have the anti-moire pattern, that is, the transparent conductive layer and/or the insulation layer with the anti-moire pattern can be directly formed.

For example, there are multiple transparent conductive layers and organic insulation layers in an add-on mode touch panel, an on-cell touch panel, or an in-cell touch panel, the case that the at least one transparent conductive layer and/or organic insulation layer has an anti-moire pattern can involve the following situations: for the transparent conductive layers and the organic insulation layers in the touch panel, only one transparent conductive layer has the anti-moire pattern; alternatively, the transparent conductive layers all have anti-moire patterns; alternatively, only one organic insulation layer has the anti-moire pattern; alternatively, the organic insulation layers all have anti-moire patterns; alternatively, one organic insulation layer and one transparent conductive layer have anti-moire patterns, one organic insulation layer and the transparent conductive layers have anti-moire patterns, the organic insulation layers and one transparent conductive layer have anti-moire patterns, and the organic insulation layers and the transparent conductive layers all have anti-moire patterns. It should be understood that in the case where the anti-moire patterns are formed on two layers or more layers, the anti-moire pattern in all the layers can be the same or can be different, as long as the interference between the metal mesh layer and the black matrix in the display module is suppressed.

For example, in the case that the touch panel comprises at least one insulation layer with an anti-moire pattern, the at least one insulation layer with the anti-moire pattern is located at a side of the metal mesh layer far away from the substrate.

For example, in the case that the touch panel comprises at least one insulation layer with an anti-moire pattern, the at least one insulation layer with the anti-moire pattern is disposed in the touch control module of the touch panel.

Taking the touch panel with the OGS structure as an example, the substrate comprises a touch control area and a periphery area around the touch control area, the metal mesh layer comprises a wire in the periphery area and a touch control electrode in the touch control area. The touch panel further comprises a black bezel pattern layer located in the periphery area and between the substrate and the metal mesh layer; a first insulation layer with an anti-moire pattern at a side of the metal mesh layer far away from the black bezel pattern layer; a transparent conductive layer on the first insulation layer with an anti-moire pattern.

Furthermore, the touch panel can further comprise a second insulation layer with an anti-moire pattern on the transparent conductive layer.

The shape of the anti-moire pattern can be in various forms, as long as the interference between the metal mesh layer and the black matrix in the display module is suppressed. As illustrated in FIG. 3 and FIG. 4, FIG. 3 is a schematic diagram of the anti-moire pattern disposed in the touch panel provided by the embodiment of the present disclosure, and FIG. 4 is another schematic diagram of the anti-moire pattern disposed in the touch panel provided by the embodiment of the present disclosure. Optionally, the anti-moire pattern can comprises a transmission grating with a plurality of stripes, or the anti-moire pattern can comprises a plurality of discontinuous scattering points. In the case that the anti-moire pattern comprises a transmission grating with a plurality of stripes, the grating can have straight line stripes, or the grating can have curve line stripes.

The touch panel can be a liquid crystal display (LCD), an organic light-emitting display (OLED), a plasma display panel (PDP), an E-paper, and so on.

A touch control display device is further provided by the embodiment of the present disclosure based on the merits of the above touch panel, the touch control display device comprises any one of the above-mentioned touch panels and a display module that is overlapped with the touch panel. At least one functional layer with an anti-moire pattern in the touch panel is overlapped with the black matrix in the display module and the metal mesh layer in the touch panel in a viewing direction. For example, the functional layer can be disposed between the black matrix and the metal mesh layer, or the functional layer can also disposed at a side of the metal mesh layer while the functional layer is not located between the black matrix and the metal mesh layer. Because the above touch panel can suppress moire fringes in displayed images, and improve display effect accordingly, the touch control display device provided by the embodiment of the present disclosure can realize a better display effect.

The touch device can be a digital control refrigerator, washing machine and so on.

Apparently, those of ordinary skill in the art will readily appreciate that many modifications are possible in the foregoing embodiments, or equivalent substitutions are made for part of technical features; however, these modifications or substitutions are not intended to make the essences of the corresponding technical solutions depart from the spirit and the scope of the technical solutions of the embodiments of the present invention.

The application claims priority to the Chinese patent application No. 201410826523.1, filed Dec. 25, 2014, the entire disclosure of which is incorporated herein by reference as part of the present application.

What is claimed is:

1. A touch panel manufacturing method, comprising:
   forming a metal mesh layer on a substrate; and
   forming at least one functional layer with an anti-moire pattern,
   wherein forming the at least one functional layer with the anti-moire pattern comprises:
   forming at least one insulation layer with the anti-moire pattern, wherein the at least one insulation layer with the anti-moire pattern is located at a side of the metal mesh layer far away form the substrate.

2. The touch panel manufacturing method according to claim 1, wherein the functional layer is a transparent conductive layer and/or an insulation layer.

3. The touch panel manufacturing method according to claim 2, wherein the functional layer with the anti-moire pattern is overlapped with the metal mesh layer in a viewing direction.

4. The touch panel manufacturing method according to claim 1, wherein the at least one insulation layer with the anti-moire pattern is disposed in a touch control module of the touch panel.

5. The touch panel manufacturing method according to claim 1, wherein the substrate comprises a touch control area and a periphery area around the touch control area, and before forming the metal mesh layer on the substrate, the method further comprises:
   forming a black bezel pattern layer in the periphery area of the substrate.

6. The touch panel manufacturing method according to claim 5, wherein forming the metal mesh layer on the substrate comprises:
   forming the metal mesh layer on the substrate formed with the black bezel pattern layer.

7. The touch panel manufacturing method according to claim 1, wherein the anti-moire pattern comprises a transmission grating with a plurality of stripes and/or comprises a plurality of discontinuous scattering points.

8. A touch panel, comprising:
   a substrate;
   a metal mesh layer on the substrate; and
   at least one functional layer with an anti-moire pattern,
   wherein an insulation layer is formed on a side of the metal mesh layer far away from the substrate, and the anti-moire pattern is formed in the insulation layer.

9. The touch panel according to claim 8, wherein the functional layer is a transparent conductive layer and/or an insulation layer.

10. The touch panel according to claim 8, wherein the functional layer with the anti-moire pattern is overlapped with the metal mesh layer in a viewing direction.

11. The touch panel according to claim 8, wherein a transparent conductive layer is formed on the insulation layer, and the anti-moire pattern is formed in the transparent conductive layer.

12. The touch panel according to claim 8, wherein at least two insulation layers and at least two transparent conductive layers are alternately formed on the metal mesh layer, and at least one insulation layer and/or at least one transparent conductive layer are formed with the anti-moire pattern.

13. The touch panel according to claim 8, wherein the insulation layer with the anti-moire pattern is disposed in a touch control module of the touch panel.

14. The touch panel according to claim 8, wherein the substrate comprises a touch control area and a periphery area around the touch control area, the metal mesh layer comprises a wire in the periphery area and a touch control electrode in the touch control area.

15. The touch panel according to claim 14, further comprising:
   a black bezel pattern layer located in the periphery area and between the substrate and the wire.

16. The touch panel according to claim 8, wherein the anti-moire pattern comprises a transmission grating with a plurality of stripes and/or comprises a plurality of discontinuous scattering points.

17. A touch control display device, comprising:
   the touch panel according to claim 8, and
   a display module overlapped with the touch panel.

* * * * *